United States Patent
Fuchikami et al.

(10) Patent No.: US 9,832,436 B1
(45) Date of Patent: Nov. 28, 2017

(54) IMAGE PROJECTION SYSTEM AND IMAGE PROJECTION METHOD

(71) Applicant: PANASONIC INTELLECTUAL PROPERTY MANAGEMENT CO., LTD., Osaka (JP)

(72) Inventors: Ryuji Fuchikami, Fukuoka (JP); Kazuhiro Minami, Osaka (JP); Yuji Sugisawa, Fukuoka (JP); Hideyuki Nakamura, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/581,735

(22) Filed: Apr. 28, 2017

(30) Foreign Application Priority Data

May 30, 2016 (JP) .................... 2016-107542

(51) Int. Cl.
 *H04N 9/31* (2006.01)
 *G06T 7/60* (2017.01)
(52) U.S. Cl.
 CPC ............ *H04N 9/3179* (2013.01); *G06T 7/60* (2013.01); *H04N 9/3164* (2013.01)
(58) Field of Classification Search
 CPC .... H04N 9/3179; H04N 9/3164; H04N 9/312; H04N 9/3129; H04N 9/3155; H04N 9/3161; H04N 9/31; G06T 7/60; G02B 26/10
 USPC .................. 348/744–747, 806, 807; 353/28; 359/641, 642, 350, 237
 See application file for complete search history.

(56) References Cited

U.S. PATENT DOCUMENTS

2006/0192925 A1 8/2006 Chang
2016/0034048 A1* 2/2016 Tanaka ................ G06F 3/0304
 345/158
2016/0088275 A1 3/2016 Fuchikami

FOREIGN PATENT DOCUMENTS

WO 2015/125403 8/2015

OTHER PUBLICATIONS

International Search Report of PCT application No. PCT/JP2017/017445 dated Aug. 31, 2017.

(Continued)

*Primary Examiner* — Sherrie Hsia
(74) *Attorney, Agent, or Firm* — Greenblum & Bernstein, P.L.C.

(57) ABSTRACT

An image projection system includes an infrared ray projection apparatus that projects a pattern image for shape measurement toward a projection target, an imaging device that captures the pattern image, a calculation device that acquires three-dimensional shape information of the projection target based on the captured pattern image and converts a content image into a projection content image corresponding to the projection target based on the three-dimensional shape information, and a visible light projection apparatus that is disposed in a different position from the infrared ray projection apparatus and projects the projection content image toward the projection target, in which the calculation device, based on images of a visible light image projected by the visible light projection apparatus and a non-visible light image projected by the infrared ray projection apparatus, executes processing of associating each pixel of the non-visible light image with each pixel of the visible light image.

9 Claims, 19 Drawing Sheets

(56) References Cited

OTHER PUBLICATIONS

Chen Jun et al: "Simultaneous projection mapping using high-frame-rate depth vision", 2014 IEEE International Conference on Robotics and Automation (ICRA), IEEE, May 31, 2014 (May 31, 2014), pp. 4506-4511, XP032650620.

* cited by examiner

IMAGE PROJECTION SYSTEM AND IMAGE PROJECTION METHOD

BACKGROUND

1. Technical Field

The present disclosure relates to an image projection system and an image projection method that project a content image to a projection target in real time in accordance with change of the projection target.

2. Description of the Related Art

A technology called projection mapping is known as a technology for projecting a desired content image to a projection target such as a building. The projection target generally has a three-dimensional shape. Thus, in the case of projecting the content image as is, an audience in a separate position from a projection apparatus may see the projected image as a distorted image because of the roughness of the surface or the magnitude of the depth of the projection target. Therefore, a content image not having a distortion can be viewed by previously measuring the correspondence between each pixel of an imaging device and the projection apparatus with respect to each point of the projection target, performing corresponding coordinate conversion for the content image, and projecting the content image.

In the case of the projection target being a fixed object such as a building, the correspondence between each pixel of the imaging device and the projection apparatus with respect to each point of the projection target is previously measured, and projection mapping is performed based on the fixed correspondence information between each pixel of the imaging device and the projection apparatus. However, projection mapping may be performed for a changing projection target (hereinafter, referred to as a "moving object") such as a vehicle, a dancer, or an athlete, and a technology for suitably performing projection mapping for the moving object is desired.

However, in the case of projection to the moving object, a movement error of a few centimeters is generated between imaging for measurement and projection in typical video processing of approximately 60 frames per second even if the moving object has a low-speed motion of, for example, approximately 1 meter per second which is approximately the same as a slow walk of a human being.

As a technology of high-speed and low-delay measurement and projection for resolving this type of problem, for example, in the pamphlet of WO2015/125403, disclosed is an image projection system including a projection apparatus and at least one imaging device. The projection apparatus projects video light representing a content image and pattern light including a pattern image corresponding to coded information of a projection coordinate in a projection coordinate system. The projection apparatus has a lens optical system, a visible light LED illuminant, an infrared LED illuminant, and one digital micromirror device (hereinafter, referred to as a "DMD") for projecting light from both illuminants. According to the image projection system, projection of the content image and measurement of the projection target are performed by the same projection apparatus. Thus, the content image can be projected to an intended position on a structural object.

The content image may be required to be projected with higher luminance and a higher frame rate to a moving object that changes at high speed. Accordingly, a technology for making the illuminant used in projection have high luminance and switching the projected image at higher speed is required in projection mapping.

Particularly, in the case of projection of a full-color image, making illuminants of each color of red, blue, and green have high luminance is technically not easy and requires high cost even with the projection apparatus disclosed in WO2015/125403. In addition, high-speed projection of four types of light of three colors of red, blue, and green and an infrared ray in addition is limited with one DMD, and furthermore, an optical system such as a mirror for guiding the four types of light to the lens optical system is very complicated.

If a visible light projection apparatus for a visible light illuminant and an infrared ray projection apparatus for an infrared ray (non-visible light) illuminant are individually disposed (that is, if individual DMDs and optical systems are used), the projected positions of the visible light and the infrared ray are different from each other, and thus, calibration processing that associates each pixel of a visible light image projected from the visible light projection apparatus with each pixel of a captured image of the imaging device (furthermore, an infrared ray image projected from the infrared ray projection apparatus) is newly required to be performed in addition to measurement processing that measures the distance of the projection target (furthermore, the position and the shape of the projection target) based on a pattern image of the infrared ray projected by the infrared ray projection apparatus as in the technology in the related art.

However, projection of the measurement result to the moving object without delay requires measurement and projection to be performed at the same time. Particularly, the visible light projection apparatus, in order to increase the luminance and the quality of a video, desirably performs projection without stopping the projection for measurement even for a short amount of time that may not be recognized by a human being. The imaging device has to image the non-visible light at the time of projection without being hindered by the visible light video and has to image both of the visible light and the non-visible light at the time of calibration processing.

SUMMARY

An object of the present disclosure is to execute measurement processing using non-visible light and calibration processing using visible light with a simple configuration.

According to an aspect of the present disclosure, there is provided an image projection system for projecting a content image toward a projection target, the system including a non-visible light projection apparatus that projects a pattern image for shape measurement toward the projection target by using non-visible light, an imaging device that captures the pattern image projected to the projection target, a measurement control device that acquires three-dimensional shape information of the projection target based on the captured pattern image, a projected image processing device that converts a previously prepared content image into a projection content image corresponding to the projection target based on the shape information, a visible light projection apparatus that is disposed in a different position from the non-visible light projection apparatus and projects the projection content image toward the projection target at the same time as the non-visible light projection apparatus by using visible light, and a calibration processing device that, based on images of a non-visible light image projected by the non-visible light projection apparatus and a visible light image projected by the visible light projection apparatus captured by the imaging device, executes processing of associating each pixel of the non-visible light image with each pixel of the visible light image.

According to the image projection system of the present disclosure, measurement processing performed with non-visible light and calibration processing using visible light can be executed with a simple configuration.

DETAILED DESCRIPTION

Hereinafter, exemplary embodiments of the present disclosure will be described with reference to the drawings.

First Exemplary Embodiment

Figure 1:
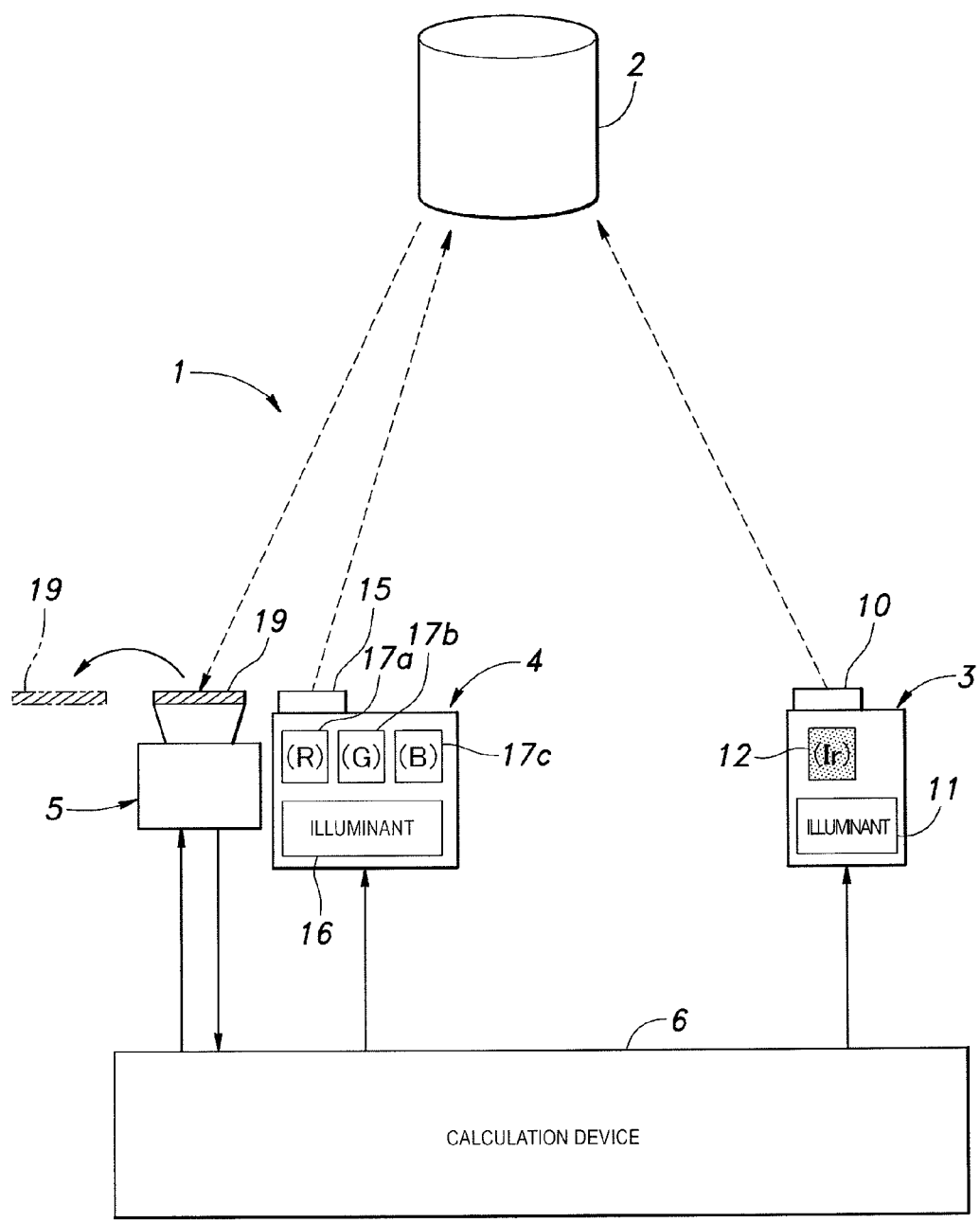
FIG. 1 is a configuration diagram of an image projection system according to a first exemplary embodiment.

FIG. 1 is a configuration diagram of image projection system 1 according to a first exemplary embodiment of the present disclosure. Image projection system 1 is a system for performing projection mapping that projects an image constituting a desired video content to a projection target, and particularly, is suitable for projection of a moving image to a changing projection target (moving object 2) such as a vehicle, a dancer, or an athlete. FIG. 1 illustrates moving object 2 in a simplified form (for example, a cylindrical shape in FIG. 1).

As illustrated in FIG. 1, image projection system 1 mainly includes infrared ray projection apparatus 3 that projects an infrared ray image toward moving object 2, visible light projection apparatus 4 that projects a visible light image toward moving object 2, imaging device 5 that can capture the infrared ray image and the visible light image projected to moving object 2, and a calculation device 6 that is communicably connected to each of apparatuses 3 and 4 and device 5 and executes various types of processing required for projection mapping. Infrared ray projection apparatus 3, visible light projection apparatus 4, and imaging device 5 can be disposed in predetermined positions.

Infrared ray projection apparatus 3 includes emission unit 10 that includes a lens system such as a projection lens, infrared ray illuminant 11 that includes an infrared ray LED emitting light in an infrared region, DMD 12 that forms a desired infrared ray image configured of a motion picture or a still picture by selectively reflecting light from infrared ray illuminant 11 toward the projection lens, and a control substrate, a processor, or the like, not illustrated, for controlling operation of infrared ray illuminant 11 or DMD 12.

Not only an LED but also another known illuminant such as a laser can be employed as infrared ray illuminant 11 as long as being capable of achieving desired luminance. In addition, infrared ray projection apparatus (non-visible light projection apparatus) 3 may project a non-visible light image by using not only an infrared ray but also another light such as an ultraviolet ray if the light is at least non-visible light (invisible light that is not visually recognized by a human being or light that corresponds to invisible light and does not significantly affect visual recognition of a content image).

Visible light projection apparatus 4 includes emission unit 15 that includes a lens system such as a projection lens, visible light illuminant 16 that includes a white laser emitting light in a visible region, DMDs (display elements) 17a, 17b, and 17c that form a desired visible light image configured of a motion picture or a still picture by selectively reflecting respective light of each color (red, green, and blue) from visible light illuminant 16 toward the projection lens, and a color substrate, a processor, or the like, not illustrated, for controlling operation of visible light illuminant 16 or DMDs 17a, to 17c. In addition, though not illustrated, white light from visible light illuminant 16 is separated into each color by a known color separation prism and is guided to DMDs 17a to 17c corresponding to each color. Furthermore, light reflected by DMDs 17a to 17c is projected to moving object 2 from the projection lens through the color separation prism.

Visible light projection apparatus 4 is disposed in a different position from at least infrared ray projection apparatus 3 and, herein, is disposed in adjacency to imaging device 5 (at least closer to imaging device 5 than to infrared ray projection apparatus 3 and more preferably close to the extent that casings of each other are almost in contact with each other). Accordingly, associating each pixel of the visible light image of visible light projection apparatus 4 with each pixel of the captured image of imaging device 5 is facilitated, and calibration processing described later can be executed in a more simplified manner.

Not only a DMD but also another known display element such as a liquid crystal display can be employed as the display element used in visible light projection apparatus 4 as long as being capable of achieving a desired frame rate in projection of the content image as the visible light image. In addition, not only a white laser but also another known illuminant such as an LED or a mercury-vapor lamp can be employed as visible light illuminant 16 as long as being capable of achieving desired luminance.

Imaging device 5 is a known digital video camera that is suitable for infrared ray imaging and measures the position and the shape of moving object 2 based on the infrared ray image, and mainly includes an image sensor, not illustrated, that has sensitivity to a wavelength region of the infrared ray (herein, has improved sensitivity to a near-infrared region). In addition, visible light cut filter 19 for preventing position and shape measurement performed with the infrared ray from being hindered by the visible light is disposed in imaging device 5. Visible light cut filter 19 is disposed outside of an object lens not illustrated (on the moving object 2 side) and is attachably detachable as illustrated in FIG. 1.

Attachment and detachment of visible light cut filter 19 can be performed manually by a user of image projection system 1. However, the present disclosure is not limited thereto, and attachment and detachment of visible light cut filter 19 may be automatically performed by adding, to imaging device 5, a filter driving device that changes the position of visible light cut filter 19 between a mounting position of visible light cut filter 19 being mounted on the object lens (emission unit 15) and a release position of visible light cut filter 19 being separated from the object lens.

As described in detail later, in image projection system 1, infrared ray projection apparatus 3 projects a pattern image configured of a plurality of predetermined patterns (frames) as the infrared image to moving object 2, and imaging device 5 captures the projected pattern image. Calculation device 6 executes measurement processing that measures the distance (three-dimensional position and shape) of moving object 2 for each pixel based on the captured pattern image. Furthermore, calculation device 6 corrects (that is, performs coordinate conversion) the previously prepared content image of the visible light based on the position and shape information of moving object 2, and visible light projection apparatus 4 projects a projection content image generated by the correction to moving object 2. Accordingly, a distortion or a shift of the visible light image projected by visible light projection apparatus 4 is reduced regardless of change (change in movement or shape) of moving object 2, and a viewer can see a more favorable content image.

Furthermore, in image projection system 1, calculation device 6 executes calibration processing that associates each pixel of the visible light image projected by visible light projection apparatus 4 with each pixel of the captured image of the visible light image captured by imaging device 5 (furthermore, the infrared ray image projected by infrared ray projection apparatus 3). A conversion parameter between each pixel acquired as a result of the calibration processing is used in correction of the content image for generating the above projection content image. Accordingly, even in the case of visible light projection apparatus 4 being disposed in a different position from infrared ray projection apparatus 3, a distortion or a shift of the visible light image projected by visible light projection apparatus 4 is reduced, and the viewer can see a more favorable content image.

Figure 2:
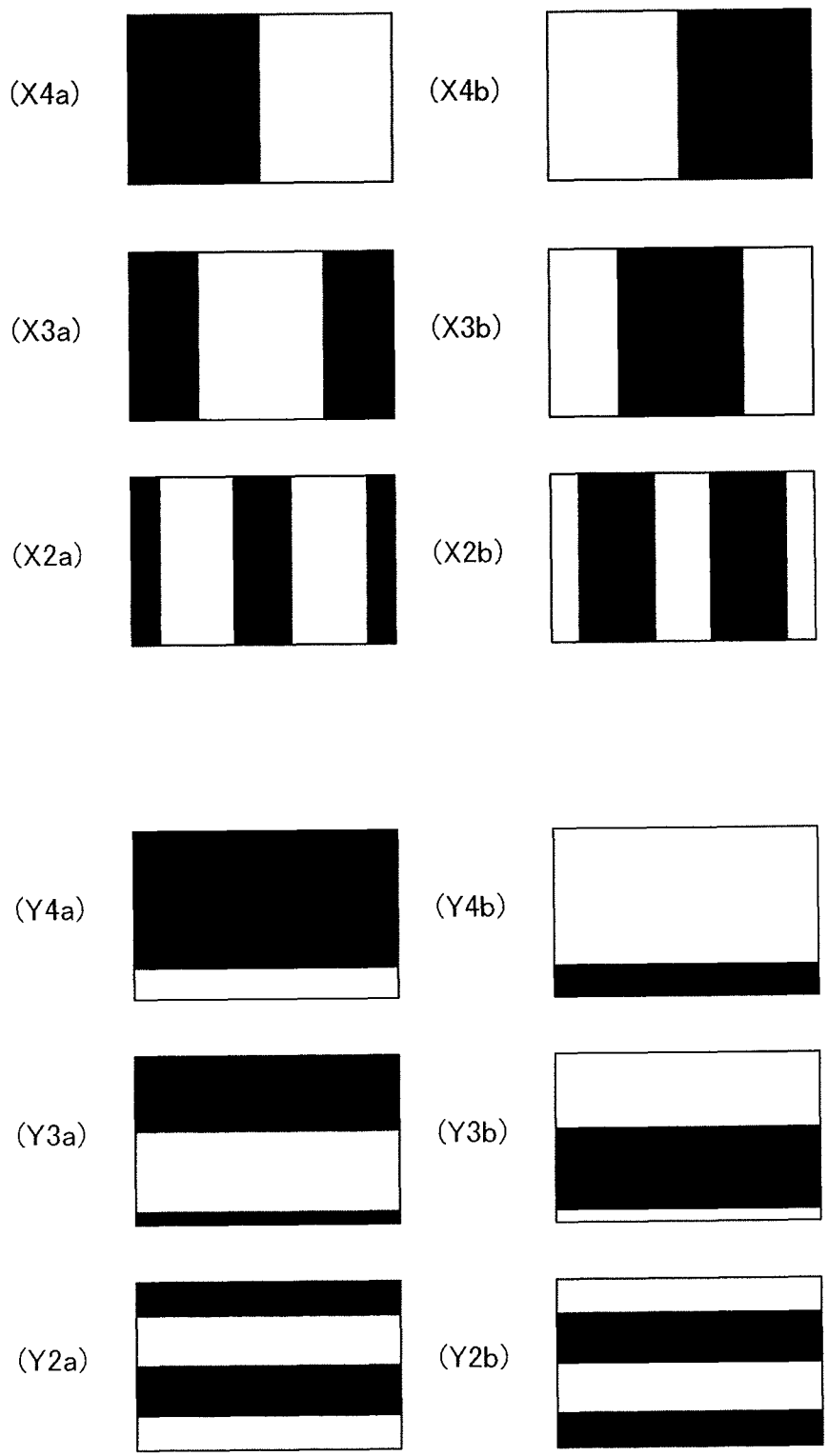
FIG. 2 is a descriptive diagram illustrating one example of a pattern image for measurement processing that is projected by an infrared ray projection apparatus.

FIG. 2 is a descriptive diagram illustrating one example of the pattern image for the measurement processing that is projected by infrared ray projection apparatus 3. The pattern image is acquired by Manchester encoding of each bit of Gray codes of an X coordinate and a Y coordinate of the DMD 12 having a predetermined number of pixels (herein, 1024×768 pixels) and by representing the Manchester code as a binary image of black and white.

Herein, coordinate information is coded by assigning 10 bits to the X coordinate and the Y coordinate. In FIG. 2, X4a and X4b are respectively a pattern indicating the ninth bit, which is the highest-order bit, of the X coordinate, and a luminance-inverted pattern as a complementary image of X4a. X3a and X3b are respectively a pattern indicating the eighth bit of the X coordinate and a luminance-inverted pattern as a complementary image of X3a. X2a and X2b are respectively a pattern indicating the seventh bit of the X coordinate and a luminance-inverted pattern as a complementary image of X2a.

In addition, Y4a and Y4b are respectively a pattern indicating the ninth bit, which is the highest-order bit, of the Y coordinate and a luminance-inverted pattern as a complementary image of Y4a. Y3a and Y3b are respectively a pattern indicating the eighth bit of the Y coordinate and a luminance-inverted pattern as a complementary image of Y3a. Y2a and Y2b are respectively a pattern indicating the seventh bit of the Y coordinate and a luminance-inverted pattern as a complementary image of Y2a.

Though not illustrated, total 40 patterns including a pattern indicating the zeroth bit are set for the X coordinate and the Y coordinate. Depth information of each pixel is intended to remove noise based on a signal of a difference of a mutually complementary image pair.

Infrared ray projection apparatus 3 projects the pattern images including 20 pairs of mutually complementary image pairs to moving object 2 in order in a predetermined amount of time. Imaging device 5 captures the pattern images, and calculation device 6 processes the captured images. Thus, each pixel in the infrared ray image projected from infrared ray projection apparatus 3 can be associated with each pixel in the captured image captured by imaging device 5. Accordingly, the distance (three-dimensional position and shape) of each pixel can be measured based on triangulation. In the measurement processing, calculation device 6 can also execute known processing that tracks the changing moving object 2.

While the present exemplary embodiment is an example in the case of 1024×768 pixels and has 40 image patterns, the number of image patterns varies depending on resolution or accuracy desired to be acquired. In addition, depending on conditions of disposing imaging device 5 and infrared ray projection apparatus 3, one of the X coordinate and the Y coordinate can be fixedly associated at all times in imaging device 5 and in infrared ray projection apparatus 3 or may be set to be shifted within a narrow range. In this case, the coordinate code of one of the X coordinate and the Y coordinate can be removed or significantly reduced.

Figure 3:
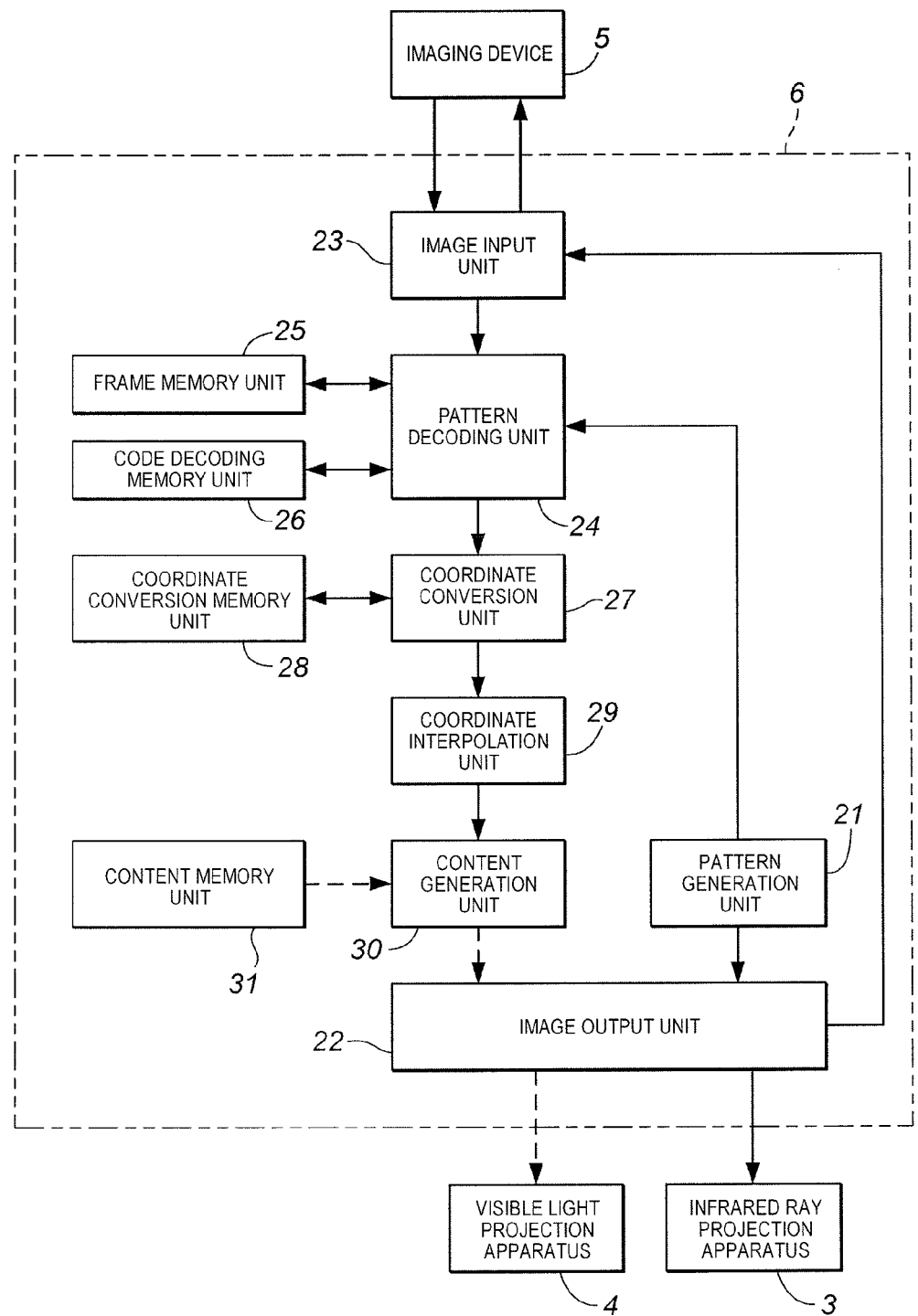
FIG. 3 is a functional block diagram illustrating details of a calculation device illustrated in FIG. 1.

FIG. 3 is a functional block diagram illustrating details of calculation device 6 illustrated in FIG. 1.

In calculation device 6, pattern generation unit 21 stores the pattern image for the measurement processing illustrated in FIG. 2 and outputs information of each pattern constituting the pattern image toward image output unit 22 in order at a predetermined timing. Image output unit 22 supplies image signals corresponding to each pattern to infrared ray projection apparatus 3. In addition, image output unit 22 transmits the timing of output of the image to image input unit 23, and image input unit 23 controls imaging device 5 to perform imaging in synchronization with the timing of image output unit 22. In addition, image output unit 22 can synchronize a projection timing of the infrared ray image of infrared ray projection apparatus 3 with a projection timing of the visible light image of visible light projection apparatus 4.

The pattern image projected to moving object 2 is captured by imaging device 5, and the acquired captured image is sent to image input unit 23 and is further sent to pattern decoding unit 24. For the received captured image, pattern decoding unit 24 calculates the difference in frame between one of the complementary image pair and the other of the complementary image pair that is previously stored in frame memory unit 25. Accordingly, determination of pixel values of the pattern image (herein, binary values of "0" and "1") can be facilitated without receiving influence of ambient light or the like.

Write regions for each pixel of imaging device 5 are disposed in code decoding memory unit 26. Pattern decoding unit 24, after calculating the difference, writes each bit value of a Gray code of coordinate data into the write regions in units of bits. Execution of this processing for 40 frames writes, into code decoding memory unit 26, values of 10 bits that indicate each of the X coordinate and the Y coordinate of each pixel of the infrared ray image of infrared ray projection apparatus 3 corresponding to each pixel of the captured image of imaging device 5.

Accordingly, code decoding memory unit 26 finally stores correspondence information of each pixel between the pattern image of infrared ray projection apparatus 3 and the captured image of imaging device 5, and the latest correspondence information of the pixels is output to coordinate conversion unit 27 each time one complementary image pair is processed. At this point, luminance and color information, distance (three-dimensional position and shape) information, and the like are added as measurement information of each pixel to the correspondence information of each pixel. Coordinate conversion unit 27 writes the measurement information of each pixel into coordinate conversion memory unit 28 in which an address corresponding to the infrared ray image of infrared ray projection apparatus 3 is set, while sorting the measurement information based on the pixel correspondence information. Then, coordinate conversion unit 27 reads a value of coordinate conversion memory unit 28 in order of coordinate of the infrared ray image of infrared ray projection apparatus 3 and sends the value to coordinate interpolation unit 29.

Coordinate interpolation unit 29 uses the measurement information of each pixel received from coordinate conversion unit 27 and, if the measurement information of each pixel does not exist, interpolates missing information if necessary. An interpolation method considered is, for example, linear interpolation or the like in the case of existence of pixels having effective measurement information within a certain range.

In addition, in calculation device 6, the correspondence information of each pixel between the pattern image of infrared ray projection apparatus 3 and the captured image of imaging device 5 can be acquired in the calibration processing, described in detail later, by the same method as the above measurement processing, and furthermore, the correspondence information of each pixel between a pattern image of visible light projection apparatus 4 and the captured image of imaging device 5 can be acquired by using a pattern image of the visible light in the same manner. Accordingly, the correspondence information of each pixel between the pattern image (infrared ray image) of infrared ray projection apparatus 3 and the pattern image (visible light image) of visible light projection apparatus 4 can be generated as calibration information.

Content memory unit 31 stores texture, motion picture data, a mesh, a shader program, and the like that are the source of the image projected to moving object 2. These are read in response to a request from content generation unit 30, and content generation unit 30 generates the projection content image projected to moving object 2 based on the measurement information and the calibration information acquired from coordinate interpolation unit 29. The projection content image is output toward image output unit 22 in order, and image output unit 22 supplies the corresponding image signal to visible light projection apparatus 4.

Calculation device 6 is configured of a computer that includes known hardware, and though not illustrated, is configured of, for example, a processor that executes information processing based on a predetermined control program, a volatile memory that functions as a work area or the like of the processor, and a non-volatile memory that stores the control program executed by the processor or data. Calculation device 6 may also be configured to include an integrated circuit that is configured of an ASIC or an FPGA. In addition, the same function as at least a part of the function of calculation device 6 illustrated in the present exemplary embodiment can also be configured to be added to at least one of infrared ray projection apparatus 3, visible light projection apparatus 4, and imaging device 5.

Figure 4:
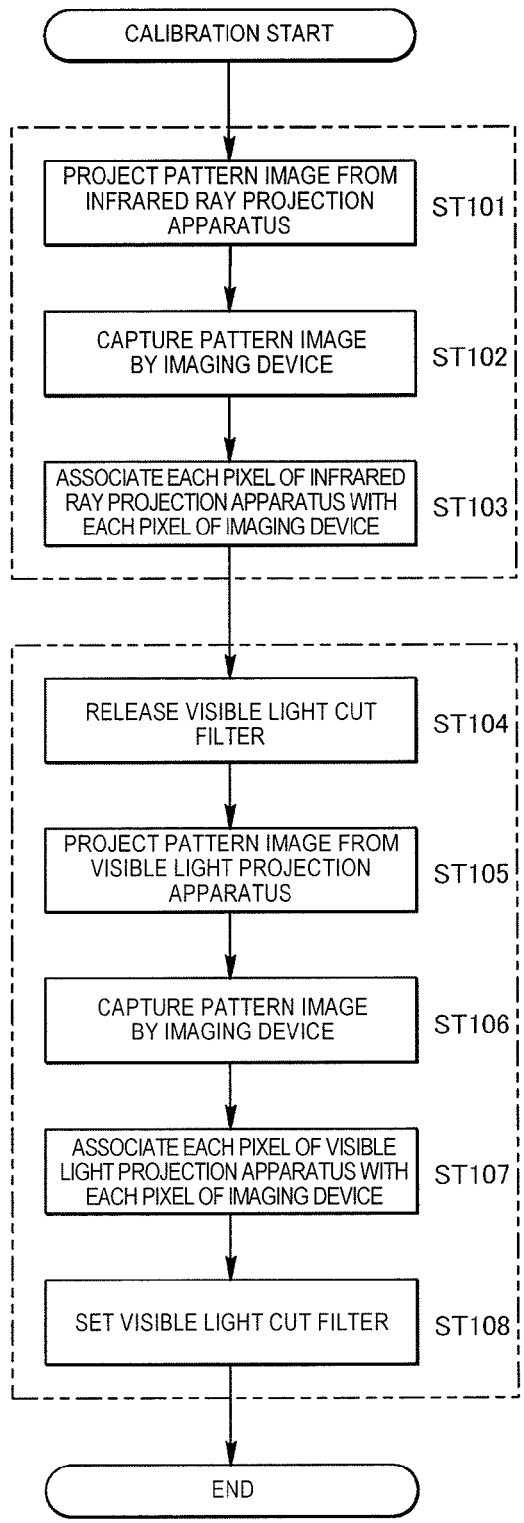
FIG. 4 is a flowchart illustrating the flow of calibration processing of the image projection system according to the first exemplary embodiment.

FIG. 4 is a flowchart illustrating the flow of the calibration processing of image projection system 1. Image projection system 1 executes the calibration processing before performing the above measurement processing (for example, at the time of completing disposing of visible light projection apparatus 4 or at the time of changing a zoom setting or a focus setting in visible light projection apparatus 4).

As illustrated in FIG. 4, in the calibration processing, infrared ray projection apparatus 3 projects the pattern image (ST101), and imaging device 5 captures the pattern image (ST102) in the same manner as the case of the above measurement processing. At this point, visible light cut filter 19 is attached to imaging device 5 (that is, visible light cutting is in effective state), and imaging device 5 can capture the infrared ray image without receiving influence of the visible light. Next, calculation device 6 associates each pixel of the infrared ray image of infrared ray projection apparatus 3 with each pixel of the captured image of imaging device 5 based on the captured image of the infrared ray acquired by imaging device 5 (ST103).

Next, visible light cut filter 19 of imaging device 5 is released (ST104), and accordingly, imaging device 5 can image the visible light. Then, visible light projection apparatus 4 projects the pattern image of the visible light (ST105), and imaging device 5 captures the pattern image (ST106) in the same manner as the case of the above measurement processing of infrared ray projection apparatus 3. Next, calculation device 6 associates each pixel of the visible light image of visible light projection apparatus 4 with each pixel of the captured image of imaging device 5 based on the captured image of the visible light acquired by imaging device 5 (ST107). Accordingly, each pixel of the visible light image of visible light projection apparatus 4 can be associated with each pixel of the infrared ray image of infrared ray projection apparatus 3.

Finally, visible light cut filter 19 of imaging device 5 is set again (ST108), visible light cutting of imaging device 5 becomes effective, and then, the measurement processing using the infrared ray image can be performed.

The execution order of above Steps ST101 to ST103 and above Steps ST104 to ST108 may be inverted.

Figure 5:
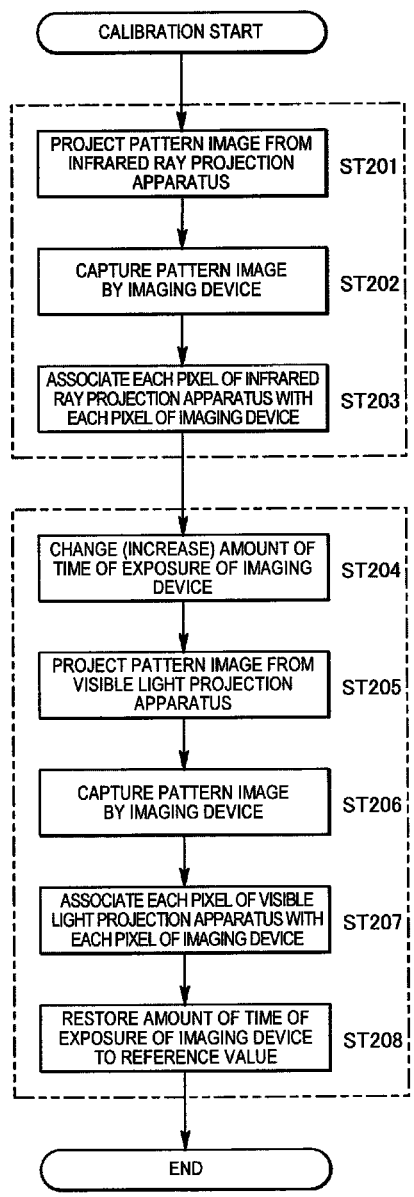
FIG. 5 is a diagram illustrating a modification example of the calibration processing illustrated in FIG. 4.

FIG. 5 is a diagram illustrating a modification example of the calibration processing illustrated in FIG. 4. While FIG. 4 illustrates an example of enabling capturing of the infrared ray image and the visible light image by attaching or detaching visible light cut filter 19 in imaging device 5, FIG. 5 illustrates an example that does not require attachment and detachment of visible light cut filter 19.

As illustrated in FIG. 5, Steps ST201 to ST203 that are the same as above Steps ST101 to ST103 in FIG. 4 are executed in the modification example. Then, calculation device 6 controls imaging device 5 to increase the amount of time of exposure (ST204), and then, Steps ST205 to ST207 that are the same as above Steps ST105 to ST107 in FIG. 4 are executed.

Finally, the amount of time of exposure of imaging device 5 returns to a reference value for imaging of the infrared ray image (ST208), and then, the measurement processing using the infrared ray image can be performed.

The execution order of above Steps ST201 to ST203 and above Steps ST204 to ST208 may be inverted.

Figure 6:
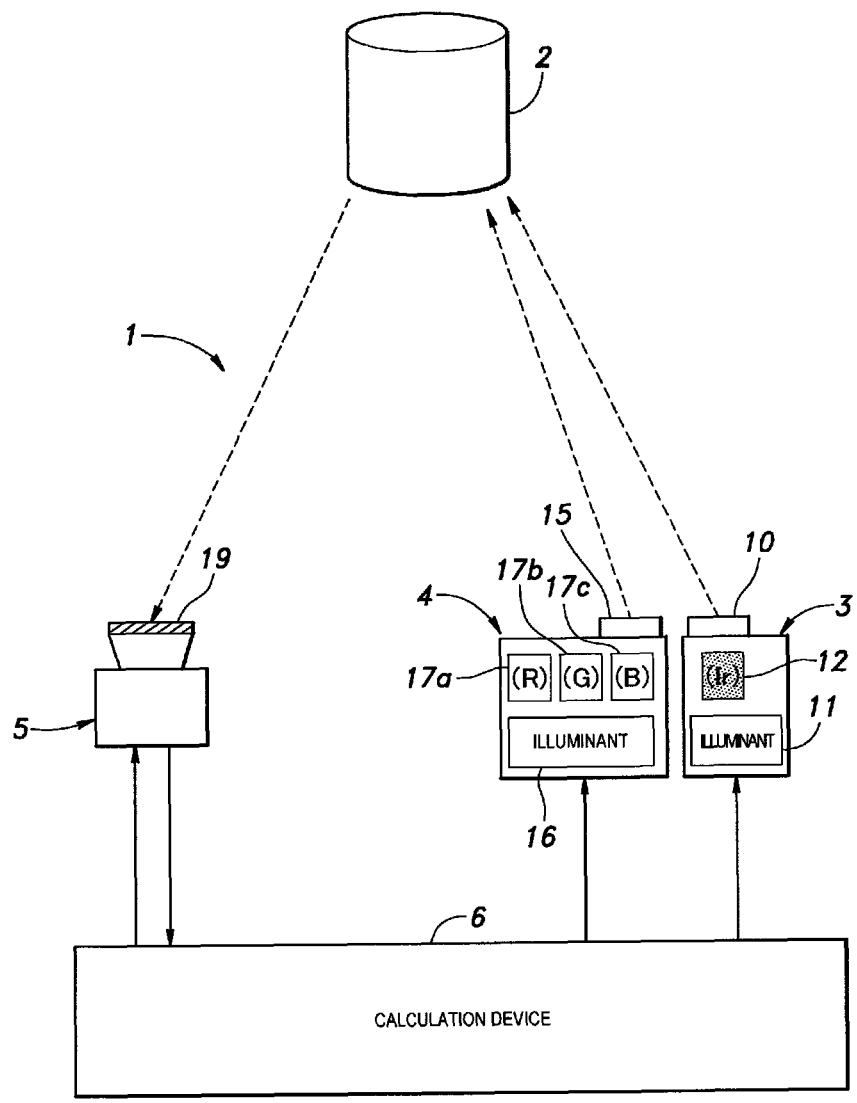
FIG. 6 is a diagram illustrating a modification example of the image projection system illustrated in FIG. 1.

FIG. 6 is a diagram illustrating a modification example of image projection system 1 illustrated in FIG. 1. In FIG. 6, the same constituents as image projection system 1 illustrated in FIG. 1 are designated by the same reference signs. In addition, image projection system 1 according to the modification example is the same as the case of the first exemplary embodiment except for matters particularly mentioned below.

While above FIG. 1 illustrates an example of disposing visible light projection apparatus 4 in adjacency to imaging device 5, the present disclosure is not limited thereto. As illustrated in FIG. 6, visible light projection apparatus 4 can be configured to be disposed in adjacency to infrared ray projection apparatus 3 (at least closer to infrared ray projection apparatus 3 than to imaging device 5 and more preferably close to the extent that casings of each other are almost in contact with each other) in image projection system 1. Accordingly, associating each pixel of the visible light image of visible light projection apparatus 4 with each pixel of the infrared ray image of infrared ray projection apparatus 3 is facilitated, and the calibration processing can be executed in a more simplified manner.

FIG. 7, FIG. 8, FIG. 9, and FIG. 10 are descriptive diagrams respectively illustrating first to fourth application examples of image projection system 1 according to the first exemplary embodiment. Herein, an example of using infrared ray projection apparatus 3 used in the above measurement processing in projection of the video content will be illustrated.

Figure 7:
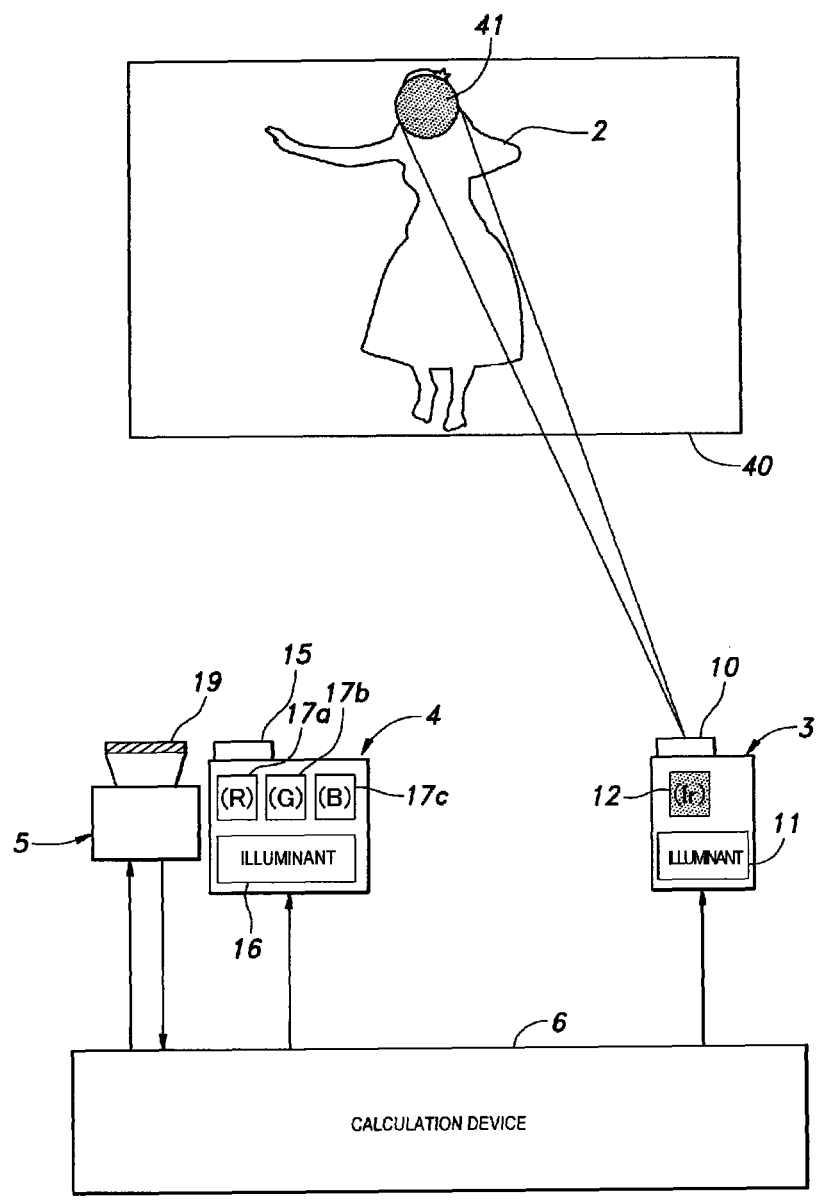
FIG. 7 is a descriptive diagram illustrating a first application example of the image projection system according to the first exemplary embodiment.

As illustrated in FIG. 7, infrared ray projection apparatus 3 in the image projection system 1 can project hindrance image 41 as the infrared ray image to a region of at least a part (herein, a facial region) of moving object 2 (herein, a performer on stage 40). Accordingly, even in the case of the audience imaging the performer or the like without permission, imaging is hindered by hindrance image 41 in a venue where imaging is not permitted. FIG. 7 illustrates an example of overlaying, as hindrance image 41, the infrared ray image configured of a figure of a predetermined shape (herein, a circle) to cover a part of moving object 2.

Projecting the infrared ray image with comparatively strong light in a near-infrared region from infrared ray projection apparatus 3 can affect the captured visible light image with a negative effect of hindrance image 41 even in the case of the audience using a camera for imaging the visible light in imaging. In addition, a target to which hindrance image 41 is projected can be limited to a part of a plurality of performers or exhibitions (for example, a performer who requires protection by the so-called right of publicity or a character that requires protection by copyright).

Figure 8:
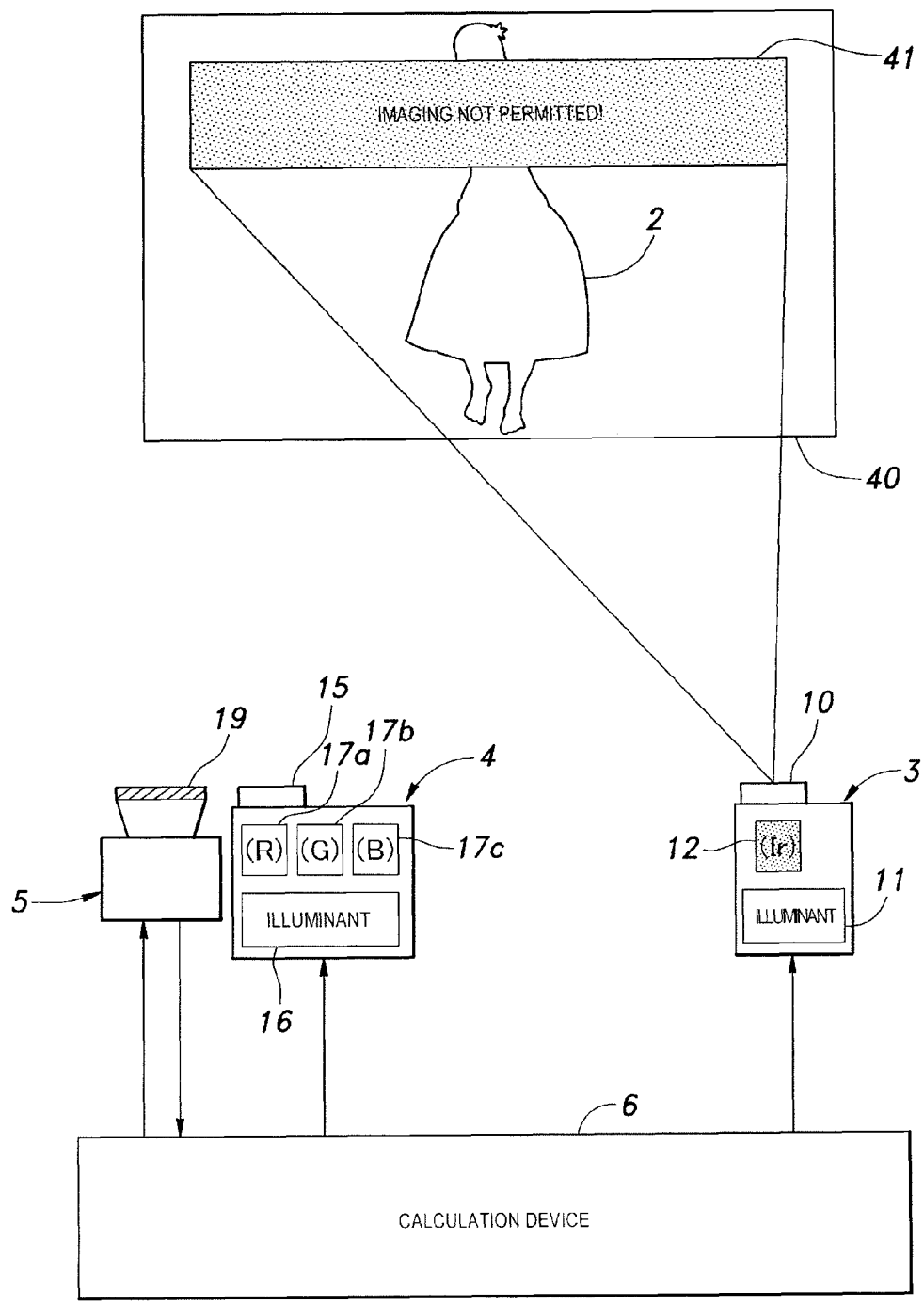
FIG. 8 is a descriptive diagram illustrating a second application example of the image projection system according to the first exemplary embodiment.

In addition, hindrance image 41 is not limited to the above shape and may be, for example, an infrared ray image that includes desired character information (herein, a cautionary message for the audience) as illustrated in FIG. 8. Accordingly, the attention of the audience who performs imaging without permission can be effectively called.

Figure 9:
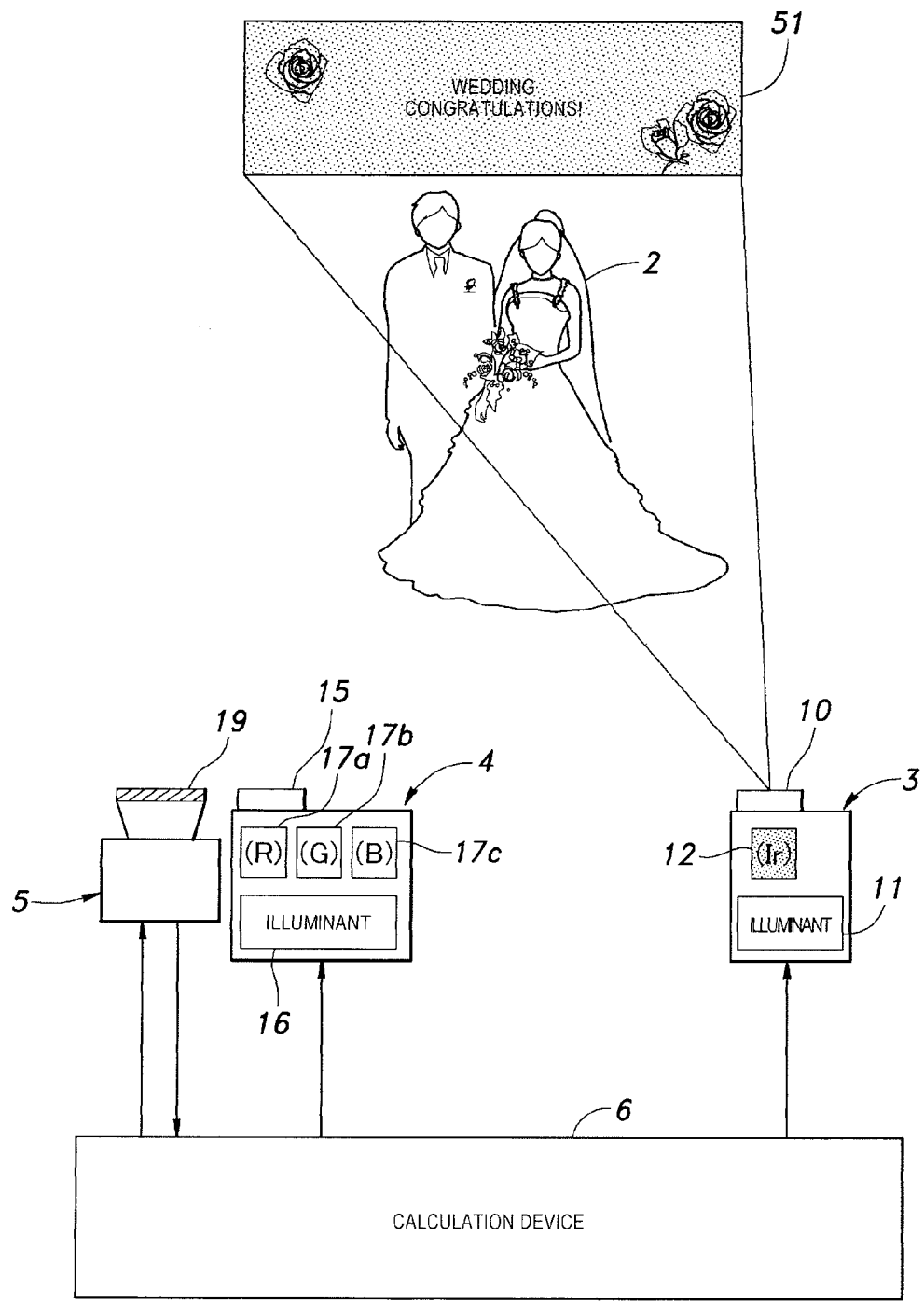
FIG. 9 is a descriptive diagram illustrating a third application example of the image projection system according to the first exemplary embodiment.

In addition, as illustrated in FIG. 9, infrared ray projection apparatus 3 in image projection system 1 can project decorative image 51 as the infrared ray image around moving object 2. FIG. 9 illustrates an example of projecting, to moving object 2 (herein, a bridegroom and a bride in a wedding), decorative image 51 as the infrared ray image that includes information configured of a desired character and a figure (herein, a congratulatory message and a figure for the bridegroom and the bride). Accordingly, when the captured image is developed (or displayed on a display), surprise or joy of a capturer (a participant or the like of the wedding) can be expected by decorative image 51 that can be visually recognized for the first time.

Projecting the infrared ray image with comparatively strong light in a near-infrared region from infrared ray projection apparatus 3 can cause decorative image 51 to appear in the captured image even in the case of the capturer using a camera for imaging the visible light in imaging.

Figure 10:
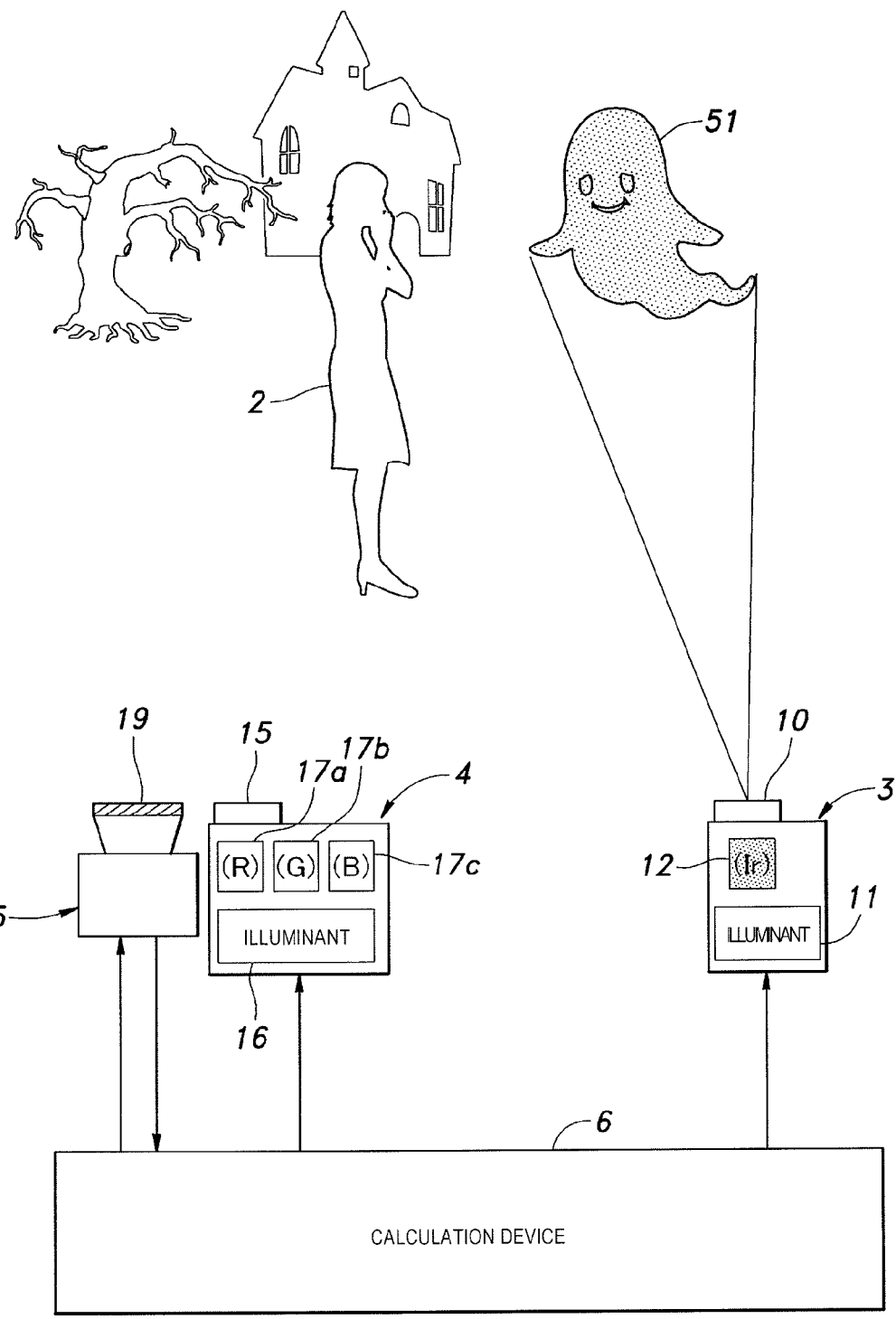
FIG. 10 is a descriptive diagram illustrating a fourth application example of the image projection system according to the first exemplary embodiment.

In addition, decorative image 51 is not limited to that in the above example of the wedding. For example, as illustrated in FIG. 10, decorative image 51 can be projected as the infrared ray image around moving object 2 (herein, a visitor) in an attraction such as a haunted house.

Second Exemplary Embodiment

Figure 11:
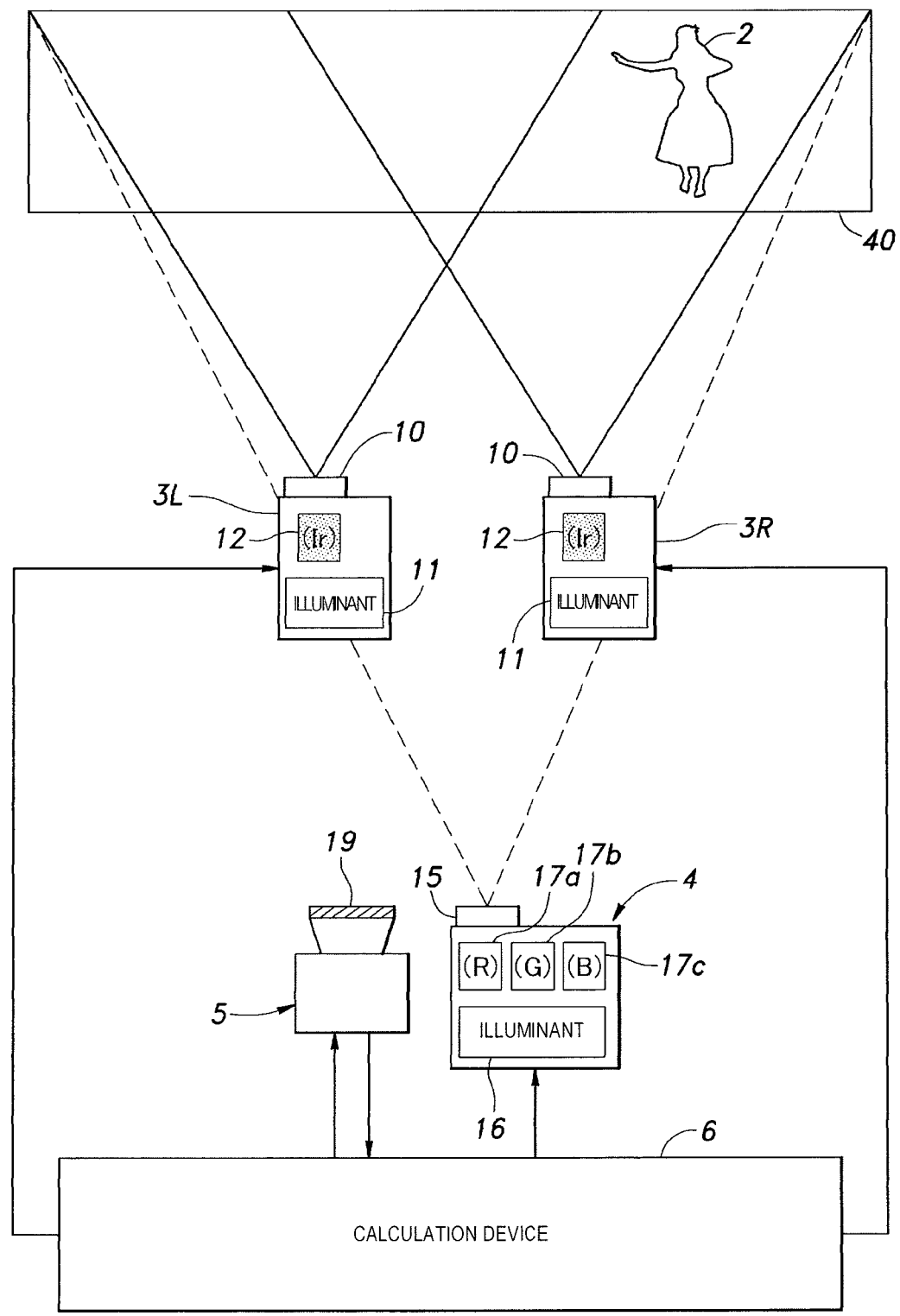
FIG. 11 is a configuration diagram of an image projection system according to a second exemplary embodiment.

FIG. 11 is a configuration diagram of image projection system 1 according to a second exemplary embodiment of the present disclosure. In FIG. 11, the same constituents as image projection system 1 illustrated in FIG. 1 are designated by the same reference signs. In addition, image projection system 1 according to the second exemplary embodiment is the same as the case of the first exemplary embodiment except for matters particularly mentioned below.

While the above first exemplary embodiment illustrates an example of projecting the infrared ray image by using one infrared ray projection apparatus 3, the light intensity of infrared ray illuminant 11 may not be sufficient in the case of moving object 2 having a comparatively wide movement region (for example, stage 40 illustrated in FIG. 11).

Therefore, a plurality (herein, two) of infrared ray projection apparatuses 3L and 3R shares a projection region in image projection system 1 according to the second exemplary embodiment. More specifically, first infrared ray projection apparatus 3L that is disposed on the left side can project the infrared ray image to a left-side region of stage 40, and second infrared ray projection apparatus 3R that is disposed on the right side can project the infrared ray image to a right-side region of stage 40. The projection regions of infrared ray projection apparatuses 3L and 3R partially overlap with each other at the center. In addition, infrared ray projection apparatuses 3L and 3R are disposed in positions closer to moving object 2 than to visible light projection apparatus 4 (in the front). With this configuration, image projection system 1 achieves the same effect as the case of increasing the light intensity of infrared ray illuminant 11 in infrared ray projection apparatus 3.

Figure 12:
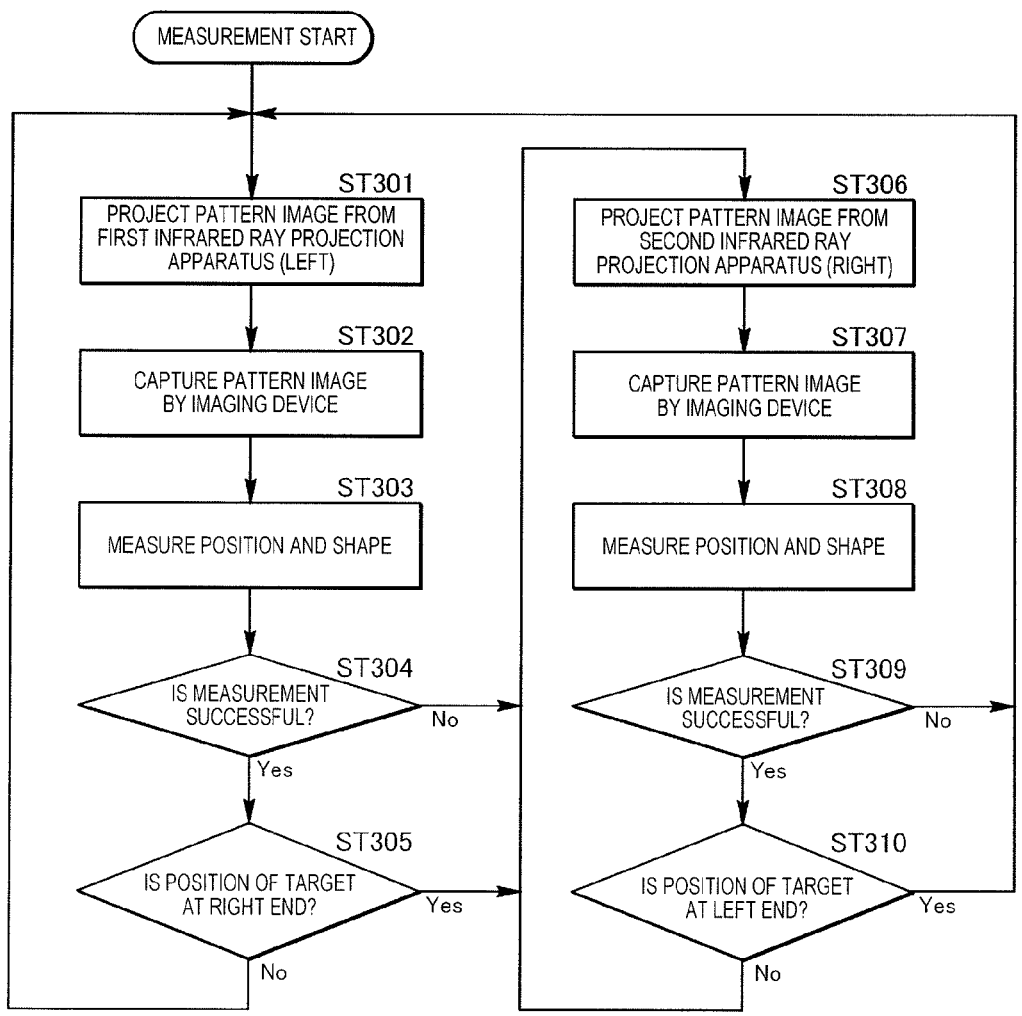
FIG. 12 is a flowchart illustrating the flow of measurement processing of the image projection system according to the second exemplary embodiment.

FIG. 12 is a flowchart illustrating the flow of measurement processing of image projection system 1 according to the second exemplary embodiment. In the measurement processing, the first infrared ray projection apparatus 3L projects the pattern image (ST201), and imaging device 5 captures the pattern image (ST202) in the same manner as the case of the above first exemplary embodiment. Next, calculation device 6 associates each pixel of the infrared ray image of infrared ray projection apparatus 3 with each pixel of the captured image of imaging device 5 based on the captured image acquired by imaging device 5 and measures distances (positions and shapes) related to each pixel (ST303).

In the case of the measurement processing in Step ST303 being successful (ST304: Yes), calculation device 6 determines whether or not moving object 2 is positioned at the right end of the projection region of first infrared ray projection apparatus 3L (herein, the area of the overlap with the projection region of second infrared ray projection apparatus 3R illustrated in FIG. 11) (ST305). Then, in the case of moving object 2 not being positioned at the right end of the projection region of first infrared ray projection apparatus 3L (ST305: No), a return is made to Step ST301, and the same processes as described above are executed.

Meanwhile, in the case of moving object 2 being positioned at the right end of the projection region of first infrared ray projection apparatus 3L (ST305: Yes), second infrared ray projection apparatus 3R instead of first infrared ray projection apparatus 3L projects the pattern image (ST306), and imaging device 5 captures the pattern image (ST307). Next, calculation device 6 associates each pixel of the infrared ray image of infrared ray projection apparatus 3 with each pixel of the captured image of imaging device 5 and measures distances (positions and shapes) related to each pixel (ST308) in the same manner as above Step ST303.

In the case of the measurement processing in Step ST308 being successful (ST309: Yes), calculation device 6 determines whether or not moving object 2 is positioned at the left end of the projection region of second infrared ray projection apparatus 3R (herein, the area of the overlap with the projection region of first infrared ray projection apparatus 3L illustrated in FIG. 11) (ST310). Then, in the case of moving object 2 not being positioned at the left end of the projection region of second infrared ray projection apparatus 3R (ST310: No), a return is made to Step ST306, and the same processes as described above are executed. Meanwhile, in the case of moving object 2 being positioned at the left end of the projection region of second infrared ray projection apparatus 3R (ST310: Yes), a return is made to Step ST301, and the same processes as described above are executed.

Figure 13:
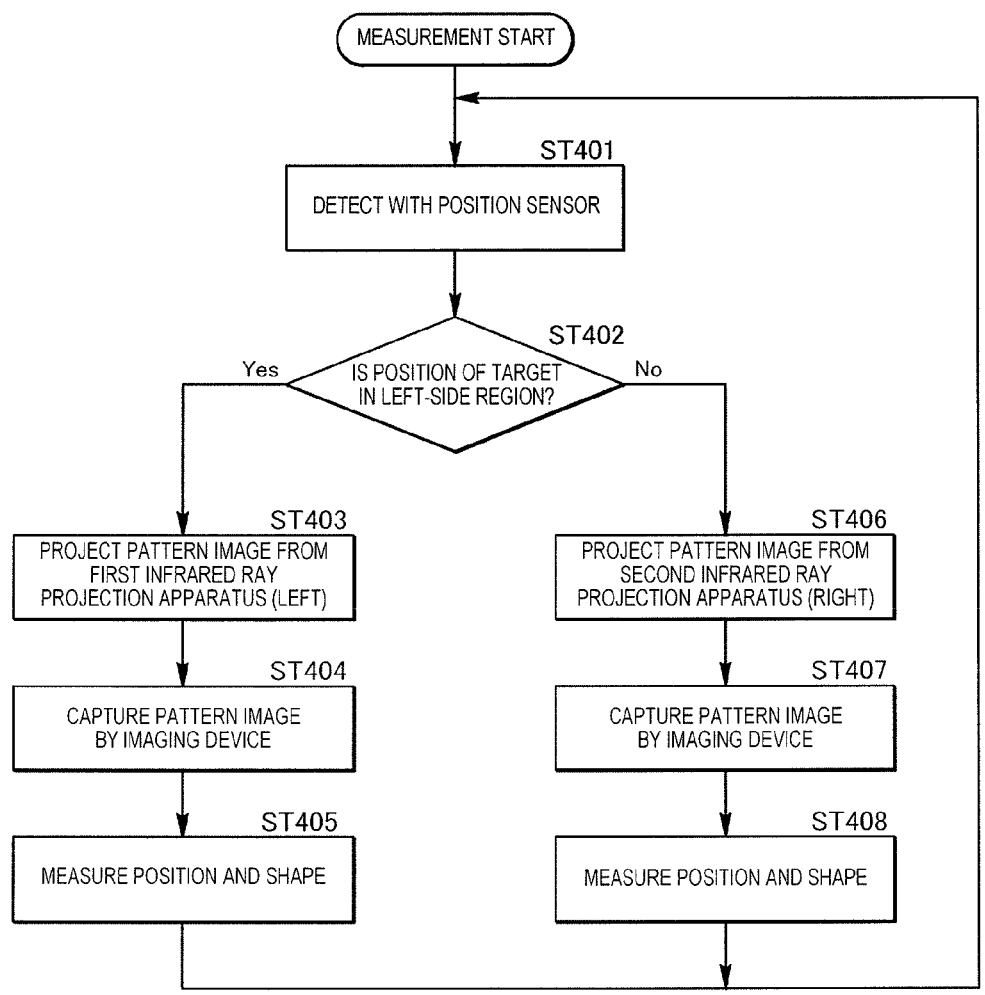
FIG. 13 is a diagram illustrating a modification example of the measurement processing illustrated in FIG. 12.

FIG. 13 is a diagram illustrating a modification example of the measurement processing illustrated in FIG. 12. While FIG. 12 illustrates an example of determining, based on positional information of moving object 2 acquired by the measurement processing, which one of first and second infrared ray projection apparatuses 3L and 3R is to be used in projection of the infrared ray image, FIG. 13 illustrates an example of detecting the position of moving object 2 with a position sensor. For example, a gravimetric sensor that is disposed on the floor of stage 40 illustrated in FIG. 11 can be used as the position sensor.

As illustrated in FIG. 13, in this modification example, first, the position of moving object 2 is detected by the position sensor (ST401). Then, calculation device 6 acquires the detection result of the position of moving object 2 and determines whether or not the position is positioned in a region on the left side of a reference position (herein, the center) of a target region (for example, stage 40 illustrated in FIG. 11) (ST402).

Then, in the case of moving object 2 being positioned in the region on the left side of the reference position (ST402: Yes), first infrared ray projection apparatus 3L projects the pattern image (ST403), and imaging device 5 captures the pattern image (ST404). Next, calculation device 6 associates each pixel of the infrared ray image of first infrared ray projection apparatus 3L with each pixel of the captured image of imaging device 5 and measures distances (positions and shapes) related to each pixel (ST405) in the same manner as Step ST303 in FIG. 12.

Meanwhile, in the case of moving object 2 being positioned in the region on the right side of the reference position (ST402: No), second infrared ray projection apparatus 3R projects the pattern image (ST406), and imaging device 5 captures the pattern image (ST407). Next, calculation device 6 associates each pixel of the infrared ray image of second infrared ray projection apparatus 3R with each pixel of the captured image of imaging device 5 and measures distances (positions and shapes) related to each pixel (ST408) in the same manner as Step ST306 in FIG. 12.

Then, above Steps ST401 to ST408 are repeated in image projection system 1.

Third Exemplary Embodiment

Figure 14:
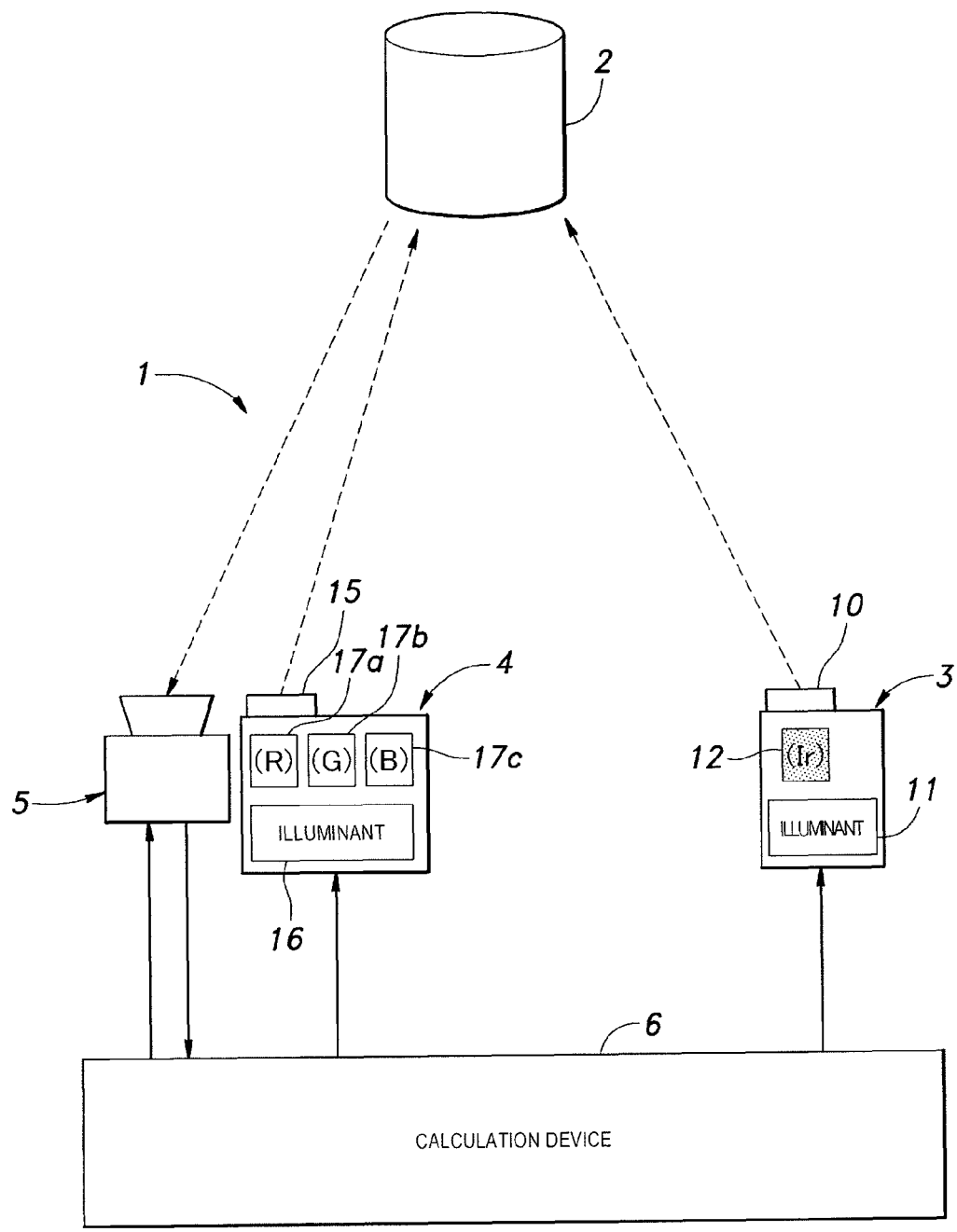
FIG. 14 is a configuration diagram of an image projection system according to a third exemplary embodiment.
Figure 15:
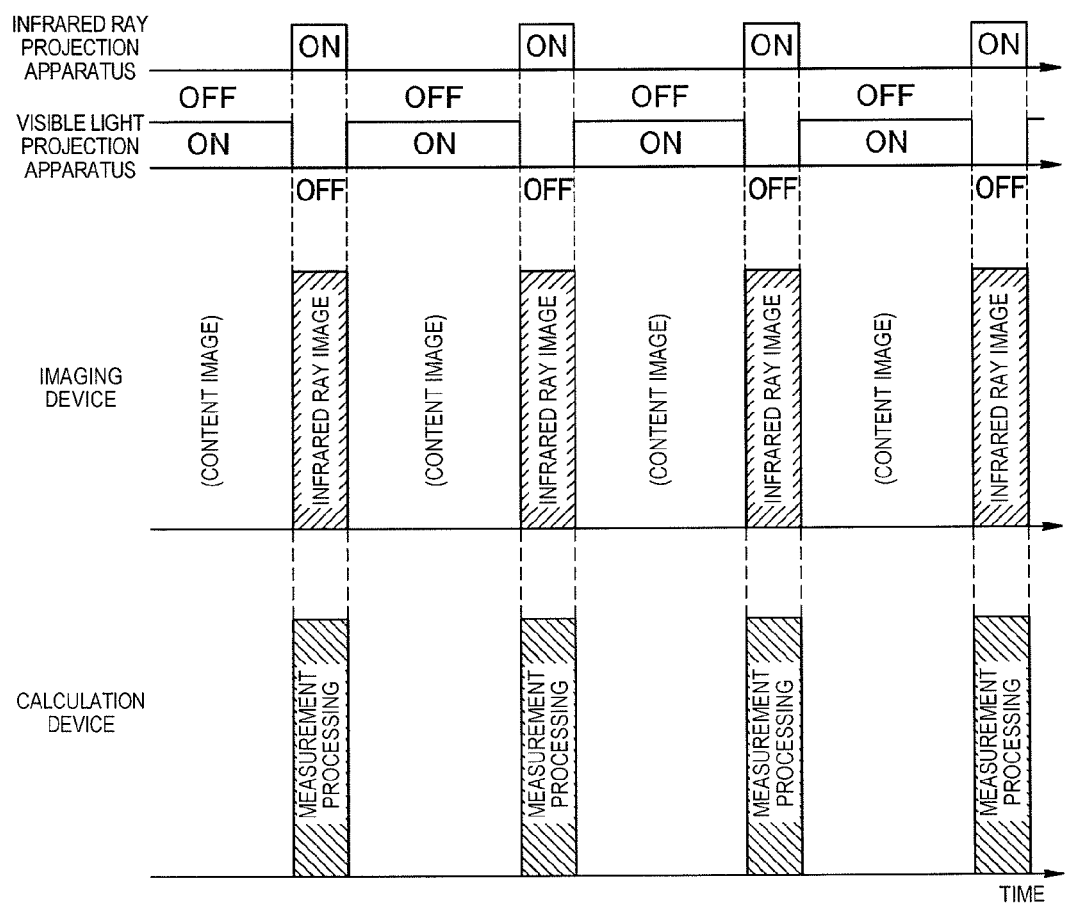
FIG. 15 is a descriptive diagram illustrating operation of the image projection system according to the third exemplary embodiment.

FIG. 14 is a configuration diagram of image projection system 1 according to a third exemplary embodiment of the present disclosure, and FIG. 15 is a descriptive diagram illustrating operation of image projection system 1 according to the third exemplary embodiment. In FIG. 14, the same constituents as image projection system 1 illustrated in FIG. 1 are designated by the same reference signs. In addition, image projection system 1 according to the third exemplary embodiment is the same as the case of the first or second exemplary embodiment except for matters particularly mentioned below.

While image projection system 1 according to the above first and second exemplary embodiments is illustrated in an example of disposing visible light cut filter 19 in imaging device 5, visible light cut filter 19 herein is not provided as illustrated in FIG. 14.

In addition, while projection of the visible light image (projection content image) of visible light projection apparatus 4 is in ON state at all times in the above first and second exemplary embodiments, projection of the visible light image from visible light projection apparatus 4 herein is periodically in OFF state as illustrated in FIG. 15. In the OFF state of the visible image light, infrared ray projection apparatus 3 sets projection of the infrared ray image (pattern image) into ON state. The amount of time in which the visible light image is in OFF state is set to an amount of time that is short to the extent that a human being (an audience or the like) cannot recognize decrease in the luminance of the visible light image due to OFF state.

That is, in the case of projection of the visible light image being in ON state, imaging device 5 is in a state capable of capturing the content image (that is, capturing of the infrared ray image may be hindered), and in the case of projection of the visible light image being in OFF state (that is, projection of the infrared ray image is in ON state), imaging device 5 is in a state capable of capturing the infrared ray image without receiving influence of the content image. Accordingly, calculation device 6 can execute the same measurement processing as described above based on the captured image of the infrared ray image (pattern image) acquired by imaging device 5.

Figure 16:
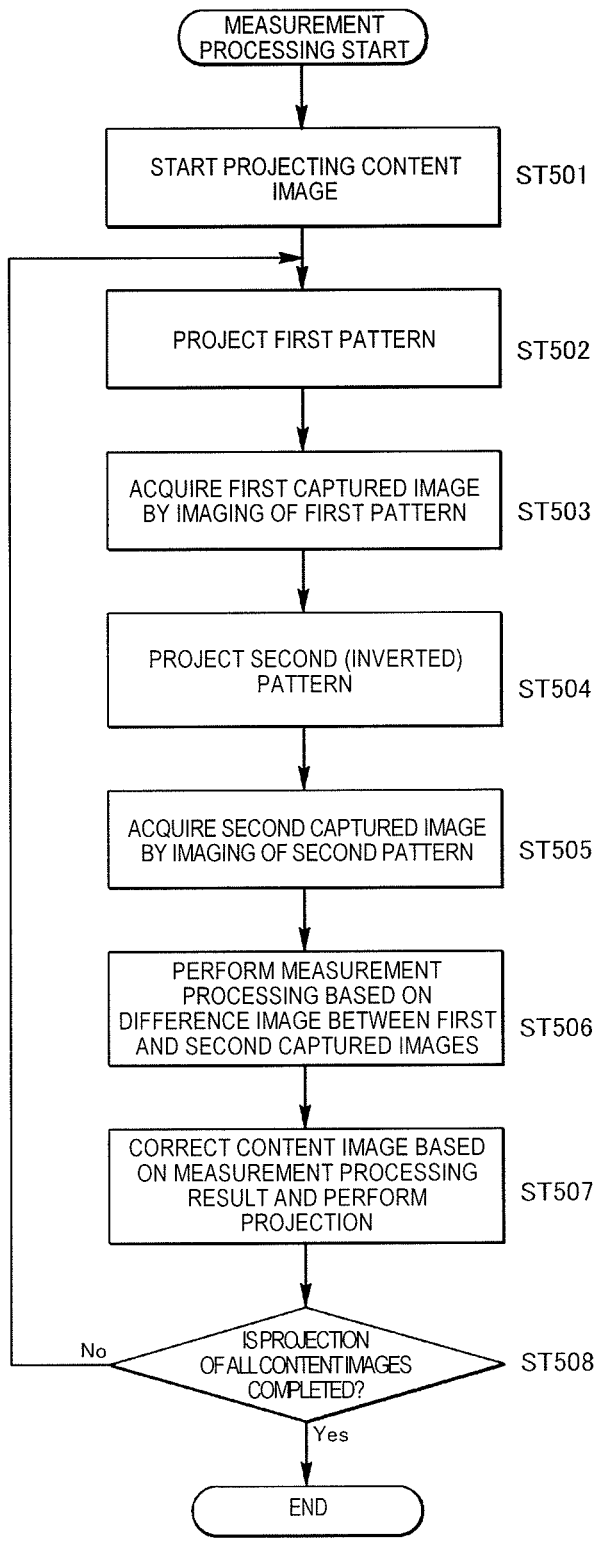
FIG. 16 is a flowchart illustrating a modification example of the operation of the image projection system according to the third exemplary embodiment.
Figure 17:
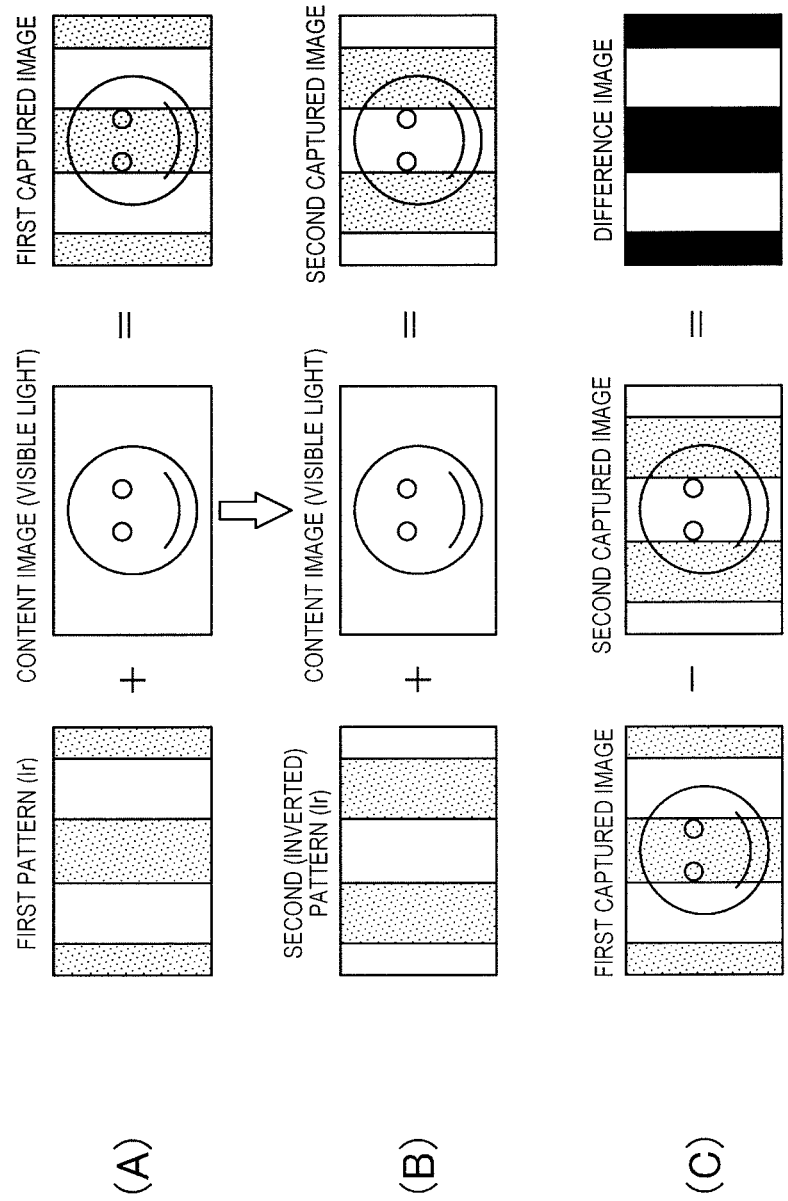
FIG. 17 is a descriptive diagram illustrating a process of Step ST506 in FIG. 16.

FIG. 16 is a flowchart illustrating a modification example of the operation of image projection system 1 according to the third exemplary embodiment, and FIG. 17 is a descriptive diagram illustrating a process of Step ST506 in FIG. 16.

While the infrared ray image can be captured without using a visible light cut filter by temporarily setting projection of the visible light image into OFF state in the above example illustrated in FIG. 15, this modification example illustrates an example of projecting the visible light image (content image) at all times (that is, the infrared ray and the visible light are incident on imaging device 5) in the measurement processing using the infrared ray image.

As illustrated in FIG. 16, first, visible light projection apparatus 4 starts projecting the projection content image to moving object 2 (ST501), and next, infrared ray projection apparatus 3 projects a first pattern (frame) to moving object 2 (ST502). The first pattern corresponds to one of the mutually complementary image pair in the above pattern image. Then, imaging device 5 images the first pattern to acquire a first captured image (ST503).

Next, infrared ray projection apparatus 3 projects a second pattern (frame) to moving object 2 (ST504). The second pattern is an inverted pattern of the first pattern and corresponds to the other of the mutually complementary image pair in the above pattern image. Then, imaging device 5 images the second pattern to acquire a second captured image (ST505). Then, calculation device 6 acquires a difference image between the first captured image and the second captured image and executes the measurement processing based on the difference image (ST506).

More specifically, the first captured image acquired in Step ST503 includes the content image of the visible light in addition to the first pattern of the infrared ray as illustrated in FIG. 17(A). In addition, the second captured image acquired in Step ST505 includes the content image of the visible light in addition to the second pattern of the infrared ray as illustrated in FIG. 17(B). Therefore, calculation device 6 can cancel out the content image of the visible light in the first and second captured images and acquire the captured image of the highlighted first pattern as the difference image by calculating the difference between the first and second captured images as illustrated in FIG. 17(C). Calculation device 6 can execute the measurement processing in the same manner as the above case by using the difference image.

Then, calculation device 6 generates the projection content image by correcting the content image based on the result of the measurement processing and causes visible light projection apparatus 4 to project the projection content image (ST507). The processes of Steps ST502 to ST507 are repeated until projection of all content images is finally completed (ST508: Yes).

Fourth Exemplary Embodiment

Figure 18:
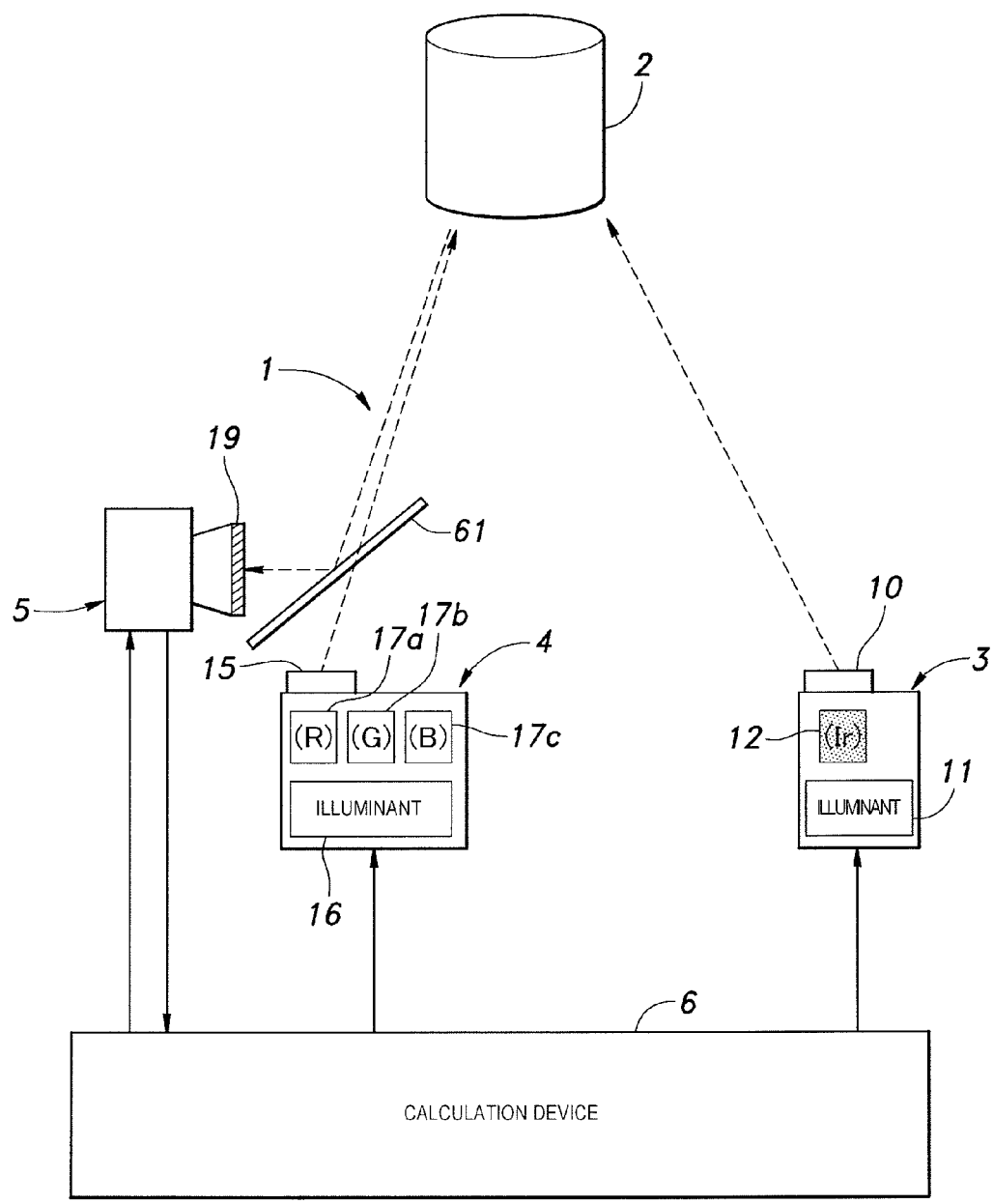
FIG. 18 is a configuration diagram of an image projection system according to a fourth exemplary embodiment.
Figure 19:
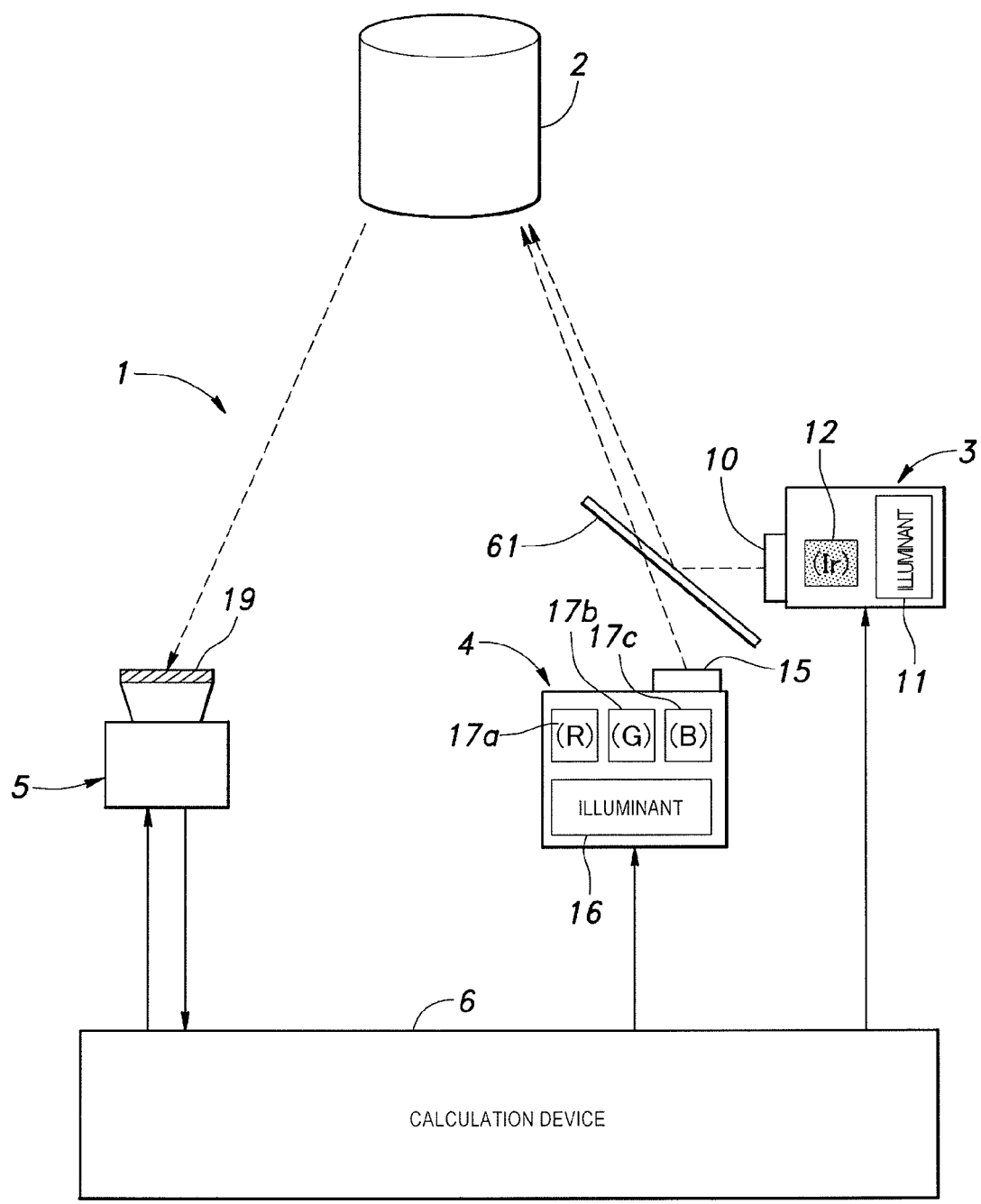
FIG. 19 is a diagram illustrating a modification example of the image projection system illustrated in FIG. 18.

FIG. 18 is a configuration diagram of image projection system 1 according to a fourth exemplary embodiment of the present disclosure, and FIG. 19 is a diagram illustrating a modification example of image projection system 1 illustrated in FIG. 18. In FIG. 18 and FIG. 19, the same constituents as image projection system 1 illustrated in FIG. 1 are designated by the same reference signs. In addition, image projection system 1 according to the fourth exemplary embodiment is the same as the case of any of the first to third exemplary embodiments except for matters particularly mentioned below.

While the above first to third exemplary embodiments illustrate an example in which visible light projection apparatus 4 and imaging device 5 respectively perform projection and imaging by using individual optical systems, hot mirror 61 is disposed between visible light projection apparatus 4 and imaging device 5 that are disposed in adjacency to each other in image projection system 1 according to the fourth exemplary embodiment as illustrated in FIG. 18.

Hot mirror 61 reflects the infrared ray that is incident on imaging device 5 from infrared ray projection apparatus 3 (the infrared ray reflected by moving object 2), and guides the infrared ray to visible light cut filter 19 (object lens system) of imaging device 5. Hot mirror 61 transmits the visible light image that is projected toward moving object 2 from visible light projection apparatus 4. With this configuration, each pixel of the visible light image projected from visible light projection apparatus 4 can be highly accurately associated with each pixel of the captured image captured by imaging device 5 in image projection system 1. Consequently, the above calibration processing may not be required.

As illustrated in the modification example of FIG. 19, hot mirror 61 can be configured to be disposed between infrared ray projection apparatus 3 and visible light projection apparatus 4 that are disposed in adjacency to each other. In this case, hot mirror 61 reflects the infrared ray projected from infrared ray projection apparatus 3 and guides the infrared ray toward moving object 2, and hot mirror 61 transmits the visible light image projected toward moving object 2 from visible light projection apparatus 4. With this configuration, each pixel of the visible light image projected from visible light projection apparatus 4 can be highly accurately associated with each pixel of the infrared ray image projected from infrared ray projection apparatus 3 in image projection system 1. Consequently, the above calibration processing may not be required.

While the present disclosure is described heretofore based on specific exemplary embodiments, those exemplary embodiments are merely for illustrative purposes, and the present disclosure is not limited to those exemplary embodiments. The image projection system and the image projection method may not necessarily include all elements, and the elements can be optionally selected at least to the extent not departing from the scope of the present disclosure.

What is claimed is:
1. An image projection system for projecting a content image toward a projection target, the system comprising:
 a non-visible light projection apparatus that projects a pattern image for shape measurement toward the projection target by using non-visible light;
 an imaging device that captures the pattern image projected to the projection target;
 a measurement control device that acquires three-dimensional shape information of the projection target based on the captured pattern image;
 a projected image processing device that converts a previously prepared content image into a projection content image corresponding to the projection target based on the shape information;

a visible light projection apparatus that is disposed in a different position from the non-visible light projection apparatus and projects the projection content image toward the projection target at the same time as the non-visible light projection apparatus by using visible light; and a calibration processing device that, based on images of a non-visible light image projected by the non-visible light projection apparatus and a visible light image projected by the visible light projection apparatus captured by the imaging device, executes processing of associating each pixel of the non-visible light image with each pixel of the visible light image.

2. The image projection system of claim 1,
wherein the visible light projection apparatus has individual display elements respectively corresponding to each color used.

3. The image projection system of claim 1,
wherein the visible light projection apparatus is disposed in adjacency to the imaging device.

4. The image projection system of claim 1,
wherein the visible light projection apparatus is disposed in adjacency to the non-visible light projection apparatus.

5. The image projection system of claim 1,
wherein a visible light cut filter is disposed in the imaging device in an attachably detachable manner.

6. An image projection method for projecting a content image toward a projection target, the method comprising:
projecting a pattern image for shape measurement toward the projection target by a non-visible light projection apparatus;
capturing the pattern image projected to the projection target by an imaging device;
acquiring three-dimensional shape information of the projection target based on the captured pattern image;
converting a previously prepared content image into a projection content image corresponding to the projection target based on the shape information;
projecting the projection content image toward the projection target by using visible light by a visible light projection apparatus that is disposed in a different position from the non-visible light projection apparatus; and
executing, based on images of a non-visible light image projected by the non-visible light projection apparatus and a visible light image projected by the visible light projection apparatus captured by the imaging device, calibration processing of associating each pixel of the non-visible light image with each pixel of the visible light image.

7. The image projection method of claim 6,
wherein a visible light cut filter is disposed in the imaging device, the visible light cut filter is used when light of the pattern image is received, and the visible light cut filter is released when light of the projection content image is received.

8. The image projection method of claim 6,
wherein the imaging device is capable of changing an amount of time of exposure and increases the amount of time of exposure more when light of the projection content image is received than when light of the pattern image is received.

9. The image projection method of claim 6,
wherein in the projecting by the non-visible light projection apparatus, an image pair that includes patterns having a mutually inverted relationship is projected in order as the pattern image,
in the capturing by the imaging device, the image pair projected in order and the projection content image projected at the same timing as the image pair are captured in order, and
in the acquiring the shape information of the projection target, the three-dimensional shape information of the projection target is acquired based on a difference image between the captured images of the image pair captured by the imaging device in order.

\* \* \* \* \*